(12) United States Patent
Jensen et al.

(10) Patent No.: US 12,556,496 B2
(45) Date of Patent: Feb. 17, 2026

(54) WORMHOLE BACKPLANE ULTRAHIGH DENSITY OPTICAL ROUTING SYSTEM

(71) Applicant: Intel Corporation, Santa Clara, CA (US)

(72) Inventors: Ralph Jensen, Hillsboro, OR (US); Michael T. Crocker, Portland, OR (US); Aaron Gorius, Upton, MA (US); Kevin P. Ma, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 17/553,053

(22) Filed: Dec. 16, 2021

(65) Prior Publication Data

US 2022/0107465 A1 Apr. 7, 2022

(51) Int. Cl.
G02B 6/26 (2006.01)
G02B 6/44 (2006.01)
H04L 49/25 (2022.01)

(52) U.S. Cl.
CPC ........ H04L 49/251 (2013.01); G02B 6/44526 (2023.05); G02B 6/44528 (2023.05)

(58) Field of Classification Search
CPC .............. H04L 49/251; G02B 6/44526; G02B 6/44528; G02B 6/26
See application file for complete search history.

(56) References Cited

U.S. PATENT DOCUMENTS

| 7,077,580 B2 * | 7/2006 | Bradley | G02B 6/3809 385/98 |
| 10,585,246 B2 * | 3/2020 | Bretz | G02B 6/4479 |
| 12,213,781 B2 * | 2/2025 | Stankovic | A61B 5/0084 |

* cited by examiner

Primary Examiner — Jennifer Doan
(74) Attorney, Agent, or Firm — Compass IP Law PC

(57) ABSTRACT

Apparatus and methods employing wormhole structures supporting ultra-high density optical routing systems. Microstructures comprising wormhole tunnels are formed in optical looms with wormhole openings arranged in patterns, such as a high-density XY grid. Optical fibers are inserted into respective wormhole tunnels, and sleeves are used to precisely align fiber ends. A rack loom comprising a wormhole backplane is fabricated in a similar manner, with wormhole openings arrayed in the same patterns. The sleeves comprise plug-receptacle sleeve pairs, where when an optical loom (or connector bar of the optical loom) face urged toward the front face of the rack loom, the plug and receptacle sleeves are mated, resulting in precise alignment of the optical fiber ends in the pairs of sleeves. Palpebral structures may also be fabricated to provide a self-cleaning function with optional lubrication. The solutions provide more than an order of magnitude improvement over current fiber connector densities, while substantially reducing costs.

15 Claims, 14 Drawing Sheets

WORMHOLE BACKPLANE ULTRAHIGH DENSITY OPTICAL ROUTING SYSTEM

GOVERNMENT RIGHTS

This invention was made with Government support under Agreement No. HR0011-17-3-0004, awarded by DARPA. The Government has certain rights in the invention.

BACKGROUND INFORMATION

The growth in cloud-based computing continues at a torrid pace. The necessitates the deployment of massive datacenters with seemingly endless rows of rack containing compute, storage, and other platforms interconnected with a multitude of cables. To continue to scale compute capabilities, ever-faster networking technologies have been developed, such as optical communication links supporting bandwidth of 100 Gigabits/second (100G) and beyond. Current optical interconnect devices—composed of optical cables and connectors—are incredibly expensive, bulky, hard to keep clean and the feasibility for density improvements are very limited. For example, the optical connectors for a single sled may exceed $5,000 and current looms or swizzle solutions may exceed $10,000 per sled.

Another way to scale performance is increase compute densities. This is being done at the chip level (e.g., System on Chip (SoC) processors/CPUs with increasing numbers of cores) and CPU density. The next generation of compute platforms will require optical interconnect densities that may be an order of magnitude or more than currently available. These cost and density limitations are halting progress towards mass production and market adaption of optical computation solutions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 6a-6c show positions of the palpebral cleaning structures during a connection process, wherein FIG. 6a shows an initial engagement of actuation prongs with a pair of lid levels, FIG. 6b shows the position of lid levers under a half-seated connection, and FIG. 6c shows a fully seated connection;

DETAILED DESCRIPTION

Figure 1:
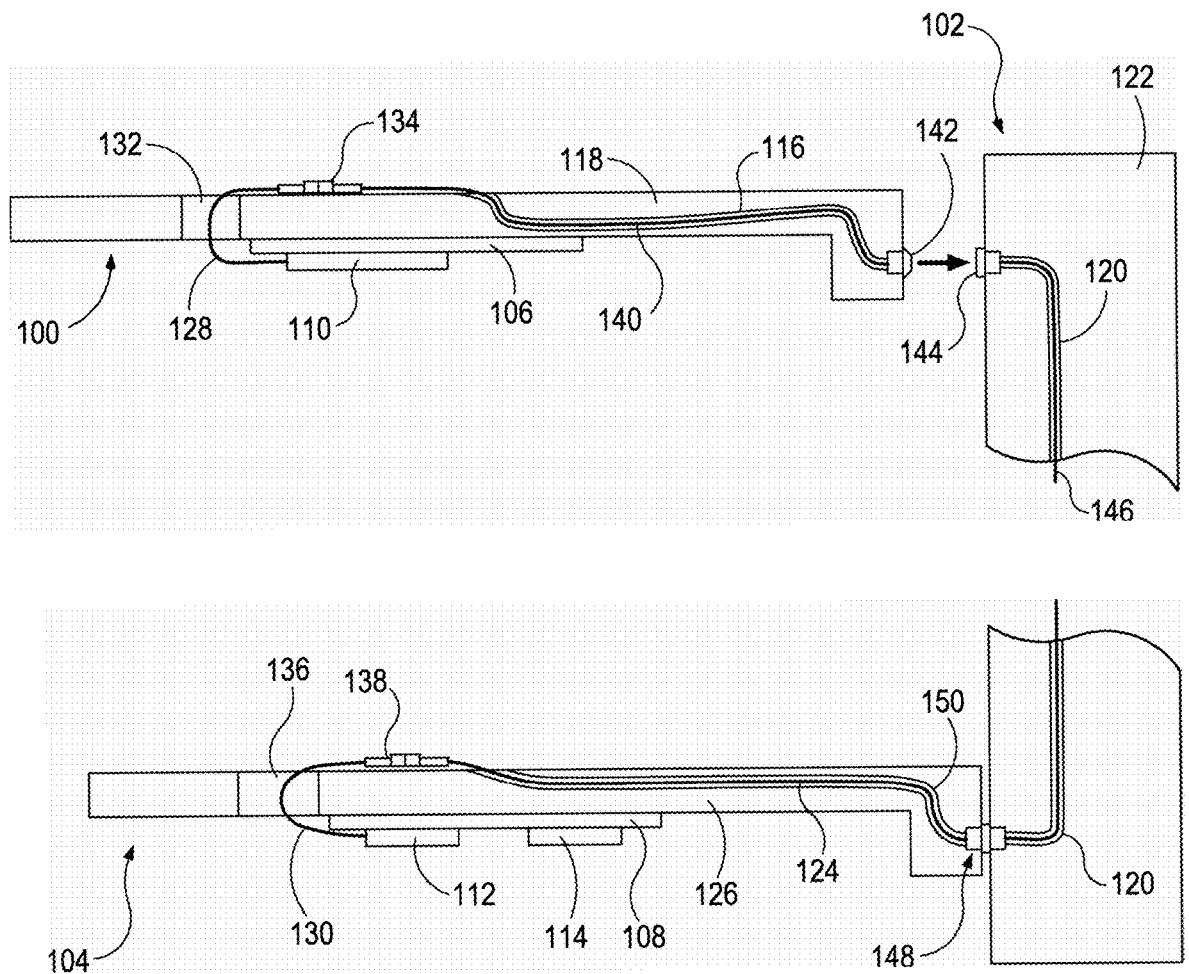
FIG. 1 is a cross-section diagram illustrating the structures and associated components of a pair of local loom and a rack loom, according to one embodiment.

Embodiments of apparatus and methods employing wormhole structures supporting ultra-high density optical routing systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 shows a cutaway view of the wormhole concepts as applied to wormhole for routing a single optical fiber connection (with connectors). The wormholes are routed through a first local loom 100, a rack loom 102, and a second local loom 104. The local looms 100 and 104 are disposed in modules or sleds in which one or more circuit boards are installed, as depicted by circuit boards 106 and 108. Multiple integrated circuit (IC) chips including processors/CPUs (central processing units), System on Chips (SoCs), networking chips, etc., are mounted or otherwise operatively coupled to the circuit board, such as depicted by chips 110, 112, and 114. As will be recognized by those skilled in the art, the actual circuit boards would include many more chips and interconnect circuitry, as well as other type of electronic components, such as but not limited to capacitors, resisters, inductors, etc.

Local loom 100 includes a fiber tunnel 116 comprising a microchannel structure referred to herein as a wormhole that is formed in a body 118 comprising a suitable material. Similarly, rack loom 102 includes a wormhole 120 comprising a fiber tunnel that is formed in a body 122, and local loom 104 includes a wormhole 124 comprising a fiber tunnel that is formed in a body 126. As described below in further detail, in one embodiment the fiber tunnel wormholes are formed using three-dimensional (3D) printing, and the body material comprises a suitable resin used in the 3D printing process. In one embodiment, each wormhole is sized for a single optical fiber and includes adequate clearance (e.g., radiuses at bends) to enable the single optical fiber to be inserted into and threaded through a wormhole without breaking. In practice, large numbers of optical fibers are inserted into respective wormholes using robotic machinery.

The implementation in FIG. 1 provides an optical communication path between chip 110 mounted to circuit board 106 and chip 112 mounted to circuit board 108. A first optical fiber segment 128 is shown coupled to chip 110 for simplicity. In practice, optical fiber segment 128 would be is coupled to a connector port in an optical module (not shown) that is mounted to circuit board 106, and there would be signal traces formed in circuit board 106. Similarly, an optical fiber segment 130 is coupled to a port in optical module 112.

Optical fiber segment 128 is routed through an aperture 132 in body 118 and is connected at its other end to an optical connector 134. Similarly, optical fiber segment 130 is routed through an aperture 136 in body 126 and is connected at its other end to an optical connector 138. Generally, optical connectors 134 and 138 may be used to connect one or more optical fiber segments.

The right end of optical connector 134 is connected to an optical fiber segment 140 that is routed through wormhole 116. A plug sleeve 142 is coupled to the right end of optical fiber segment 140. When the module or sled is installed in its slot in a rack in which rack loom 102 is installed, plug sleeve 142 is inserted into a receptacle sleeve 144 mounted in a first end of wormhole 120 in body 122, enabling optical fiber segment 116 to be optically coupled to an optical fiber segment 146 routed through wormhole 120 in body 122. A similar pair of plug and receptacle sleeves are used in an optical connector 148 disposed toward the lower end of optical fiber segment 146, with the receptacle sleeve coupled to optical fiber segment 146.

In a manner similar to that described above for optical fiber segment 140, an optical fiber segment 150 is disposed in wormhole 124 in body 126 of loom 104. The left-hand end or optical fiber segment 150 is coupled to optical connector 138, while the right-hand end is coupled to the plug sleeve in optical connector 148.

It is noted that the components in FIG. 1 are not drawn to scale as the diameters of the wormholes and optical fiber segments is extremely small. For example, in one embodiment, the wormholes have a diameter of 0.125 mm. Other embodiments may employ wormholes having a diameter from approximately 0.125 mm to 1 mm, where the diameter of the wormholes should be selected based on the diameter of the fibers to be utilized.

Figure 2:
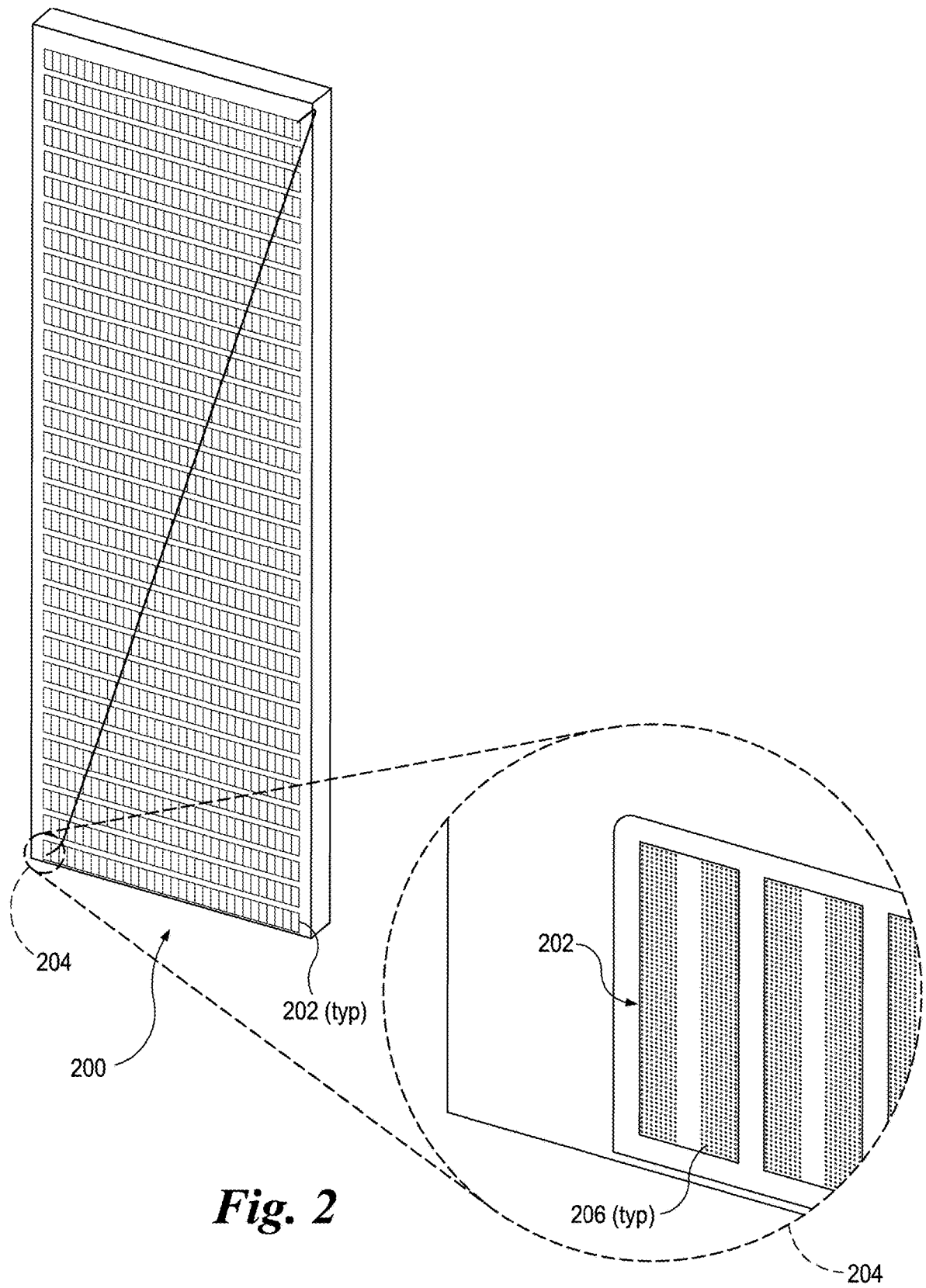
FIG. 2 is a diagram illustrating a rack loom comprising a wormhole backplane, according to one embodiment.

FIG. 2 shows a wormhole backplane main body 200 also referred to above as a rack loom. The wormhole backplane has a very large number of wormholes formed therein. The openings of the wormholes are arranged in an array of tiles 202. As shown in the blown-up detail 204, each tile 202 includes multiple wormhole openings 206. Also as shown, these wormhole openings are arranged in predetermined patterns, such as a 2D grid.

In one embodiment, the total fiber count for the wormhole backplane main body is more than 1,000,000. In one embodiment for a rack that is 36 standard rack units high the number is 1,048,576, which of course is merely exemplary and non-limiting.

In one embodiment, wormhole backplane main body 200 is fabricated using a 3D digital light projector (DLP) printing process employing a resin that is printed using light projection through a 4K-DLP projector system that cures the resin. This new fabrication technology can produce very fine details, such as 0.125 mm diameter wormholes in one embodiment. The 3D DLP printer technology is also much faster than previous 3D printer technology.

To fabricate a Wormhole Backplane for a rack (aka a rack loom), such as shown in FIG. 2, multiple modules are fabricated using 3D DLP printing, and then the modules are combined to form a monolithic body. In one embodiment, the modules are cube structures that are aligned (using suitable equipment) and bonded together.

Fiber End Alignment with Micro Sleeves

In accordance with another aspect of some embodiments, micro "sleeves" are used to align fiber ends at a multitude of connections simultaneously, wherein a plug sleeve is inserted a receptacle sleeve. Optical fibers convey/carry light signals with their cores. To operate properly, the ends of two optical fibers within a connector need to be precisely aligned. This is a primary reason why current multi-fiber connectors with multiple single mode optical fibers (e.g., up to 24 fibers) are so expensive.

Figure 3:
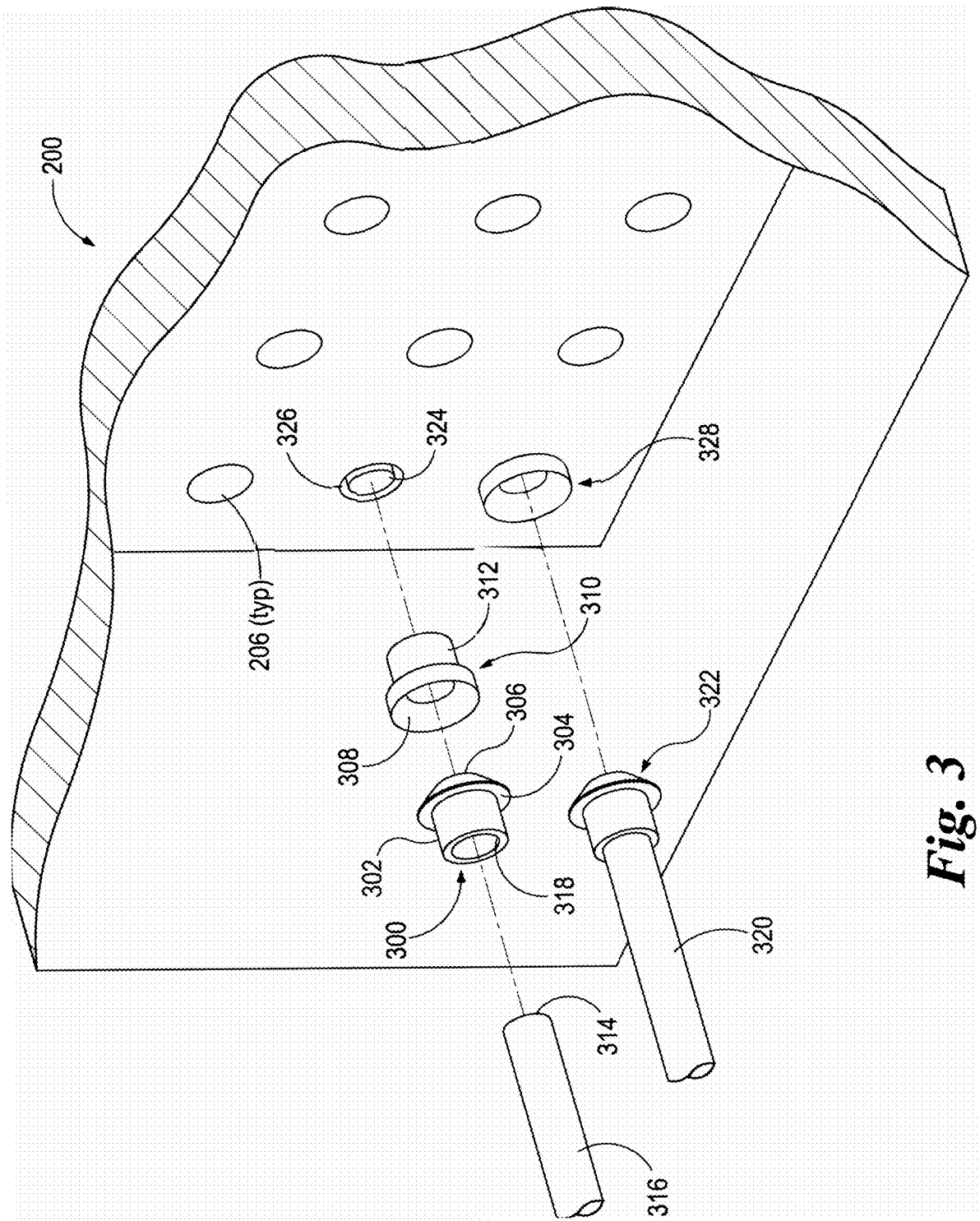
FIG. 3 is a diagram illustrating details of plug and receptacle sleeves and how they are utilized to align optical fiber ends.

FIG. 3 shows further details of aspects of the plug and receptacle sleeves, according to one embodiment. A plug sleeve 300 includes a cylindrical sleeve 302 with a shoulder 304 toward one end, leaving a head 306 of the sleeve at the end that mates with the receptacle sleeve. Head 306 is sized to fit within a counterbore 308 of a receptacle sleeve 310 including a sleeve skirt 312. In one embodiment, counterbore 308 is chamfered, as is head 306 (chamfers not shown in FIG. 3, but shown in FIGS. 6a and 6b below).

An end 314 of an optical fiber 316 is inserted into an inner bore 318 of sleeve 302, resulting in the configuration shown below where an optical fiber 320 has been inserted into the inner bore of the sleeve for a plug sleeve 322. The inner bore of sleeve 312 is likewise sized such that in slips over the end of an optical fiber 324 when receptacle sleeve 310 is installed in at an opening 326 of a wormhole 206 formed in the wormhole backplane main body 200. The installed configuration is shown below for a receptacle sleeve 328.

Single mode fibers have tiny cores used to carry the light signals, which are as small as 8 µm (microns) in diameter, in one embodiment. The tapered surfaces of the plug and receptacle sleeves act to precisely axially align the fiber end in the wormhole backplane to the opposing fiber in the sled loom.

In one embodiment, the sleeves can be bonded to the fibers with a tight slip fit and adhesive. But a better means of attachment is to use a thermal shrink fitting process, which yields a more robust and accurate attachment. In one embodiment, sleeves are attached to fiber ends prior to insertion of the fibers and sleeves into wormhole openings. Under another approach, a fiber is inserted into a wormhole using automated robotic machinery, and a split sleeve is used, where a split in the sleeve enables the sleeve to slip over the fiber while the fiber is being held by a machine tool head. The slip sleeve will then be pushed into a wormhole opening, causing the sleeve to close and firmly hold the fiber in place. The machine tool head will then cut the fiber such that the end of the fiber is flush with the head of the sleeve.

Fiber-to-fiber end face misalignment is the principle source of signal loss in optical networks. The individual fiber pair alignment afforded by pairs of mating sleeves is extremely accurate. But in groups of mating fibers' sleeve positions, relative to each other, are controlled by the base structure. The position tolerance of the base structure—hole to hole (axis to axis)—is a huge problem that is exacerbated as the distance between holes increase, as with large arrays of fiber end patterns. This effect is what limits current multi-fiber connectors to a maximum of 24 single mode fibers; The base structure of a standard MTP ferrule is a polymer that has a maximum distance of 2.8 mm between fibers. In one embodiment, the wormhole backplane has holes as far as 1628 mm apart. However, using modern robotic machinery, the necessary alignment accuracy for such large hole spacings can be achieved.

Another requirement for good fiber-to-fiber connections is the contact forces between the fiber ends. In an MTP connector a coil spring is used to generate a nominal 0.83 grams force between each fiber pair. But the bigger the field of fiber ends the larger the variance in forces.

Figure 4:
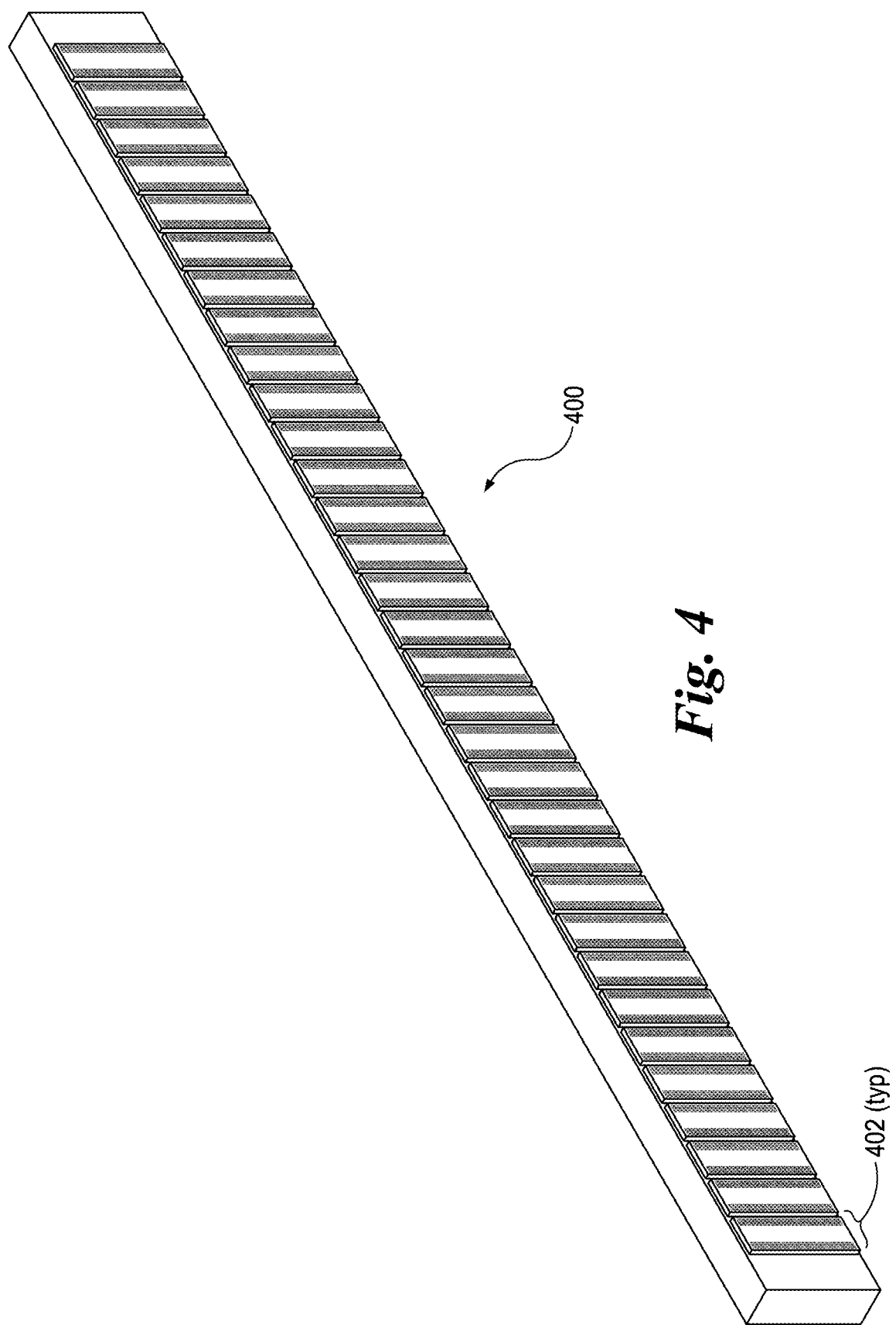
FIG. 4 is a diagram of a Connector Bar structure, according to one embodiment.
Figure 5:
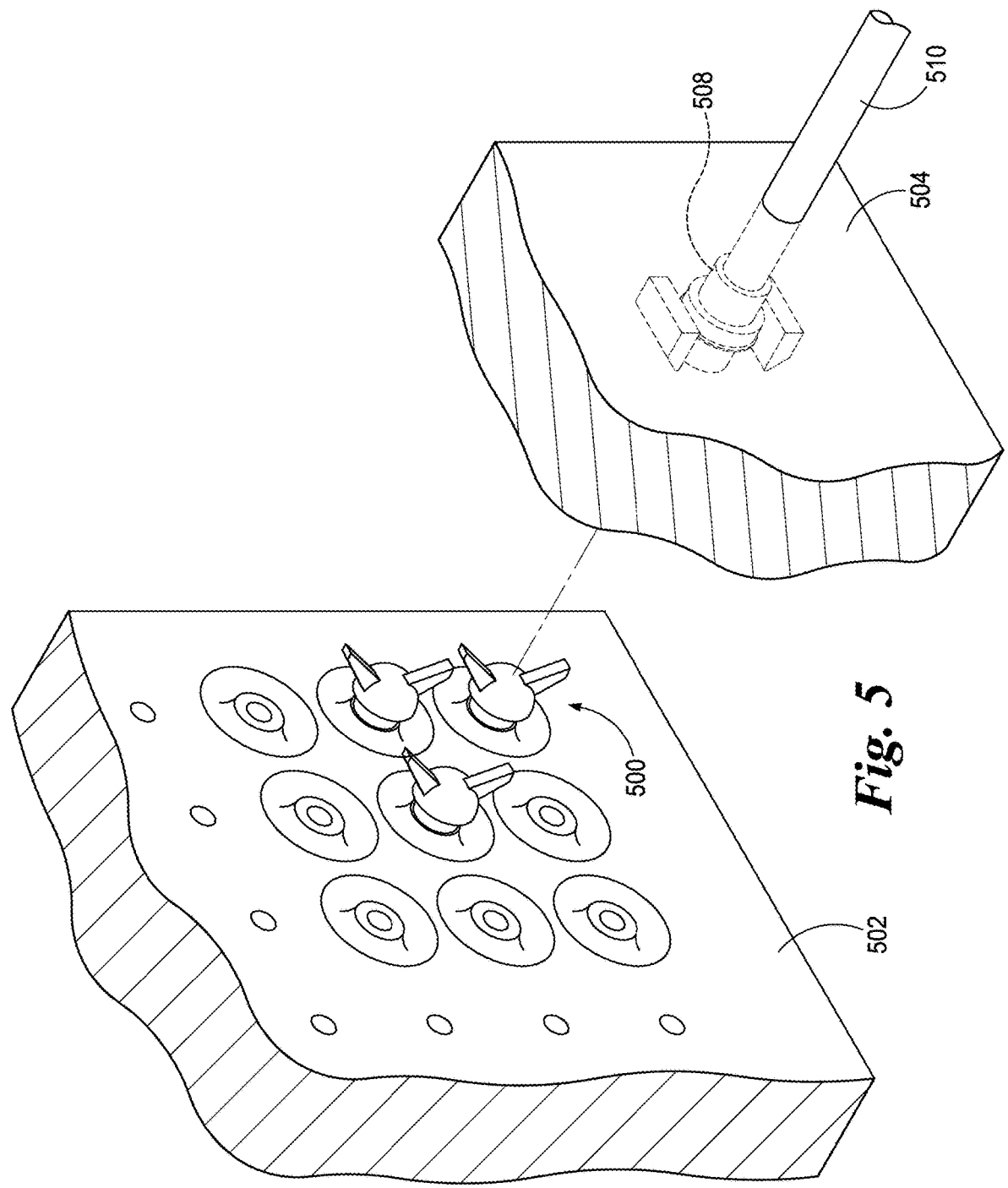
FIG. 5 is a 3D diagram illustrating a palpebral fiber-end cleaning cap and associated structures.

The wormhole backplane concept solves both the axis-to-axis fiber alignment tolerance, and fiber end force tolerance (even forces) problems. This is achieved, in part, with a Connector Bar component, which is a 3D printed elastomeric structure that mates with the rack (wormhole) backplane. An example of a Connector Bar 400 is shown in FIG. 4. In one exemplary implementation, the Connector Bar is part of a sled assembly. In one embodiment, the plug sleeves and fibers on the left of FIG. 3 would be embedded in the Connector Bar. Because the Connector Bar is composed of an elastomer of an optimal flexibility/hardness (e.g., Durometer A—45 to 55) it will firmly hold the fiber end sleeves, but also easily comply along directions parallel to the plane of the Connector Bar face. It will also comply in the normal direction to the face. This normal compliance ensure face to face contact throughout all the fibers, as well as transmitting the normal connection forces through each fiber end face pair. These normal forces are generated via hydraulic pressures within the Connector Bar. The hydraulic pressure is transmitted throughout the Connector Bar thru hydraulic fluid or leak-proof gel, in a manner similar to Flat Jacks used in heavy construction. In the process of 3D printing the Connector Bar, hollow interconnected chambers are constructed under, but near the face of the Connector Bar, which hold the hydraulic fluid/gel.

The Connector Bar needs to be constrained around its periphery—all sides but the connecting face—so that the hydraulic forces and compliance is transmitted through that face only. In one embodiment, the Connector Bar outer constraints are achieved via rigid brackets or rigid material printed into the faces other than the connector face. Through the use of Multi Jet Printing (MJP), ridged and elastomeric material can be continuously varied throughout a printed part. For an example of an MJP system see www dot 3dsystems dot com/resources/information-guides/multi-jet-printing/mjp. In one exemplary and none limiting embodiment a DLP 3D printer manufactured by Kudo3D is used to fabricate the wormhole loom structures, such as connector bars and wormhole backplanes described and illustrated herein.

As shown in FIG. 4, in some embodiments of Connector Bar 400 is composed of connector bar modules 402. The use of modules enables connector bars to be fabricated that are larger than might be possible with currently available 3D DLP printers.

In one embodiment the Connector Bar is an integral part of the Local Loom. For example, the right sections of the Local Looms shown in FIG. 1 would comprise Connector Bars. The mechanism which generates the hydraulic pressure could be generated by the action of connecting the Rack Backplane to the Connector Bars—as the surfaces make contact and are forced together. Optionally, the hydraulic pressure can be created and regulated by an electrically activated cylinder which pumps the fluid into the Bars after all the Looms and Connector Bars are mated together. This latter method dramatically reduces mating forces for the whole interconnection system.

Another important aspect provided by the embodiments herein is to support for substantially any sized (typically hand sized) cable connectors with any number of fibers. Embodiments of these cable connectors will use the same components and functions of the bigger Loom and Backplane devices, but are much smaller, as they are part of optical multifiber cables. Also, because of the size and costs it would be advantageous to use a toggle mechanism applying force upon the smaller Connector Bars, instead of hydraulic cylinders for generating the hydraulic pressures needed.

Another function that can be achieved with the 3D printed elastomeric materials is to create self-cleaning devices at the fiber ends. In one embodiment shown in FIGS. 5 and 6a-6c, palpebral cleaning structures comprising palpebral fiber-end cleaning caps 500 are fabricated in a connector bar 502 using 3D printing. The fiber-end cleaning caps operate like eyelids and act as dust covers and may contain optical gel, or other optical fluid/lubrication, in some embodiments. FIGS. 5 and 6a-6c further show a rack backplane section 504 in which a receptacle sleeve 508 is installed, and wherein the end of an optical fiber 510 has been inserted into receptacle sleeve 508.

Figure 6A:
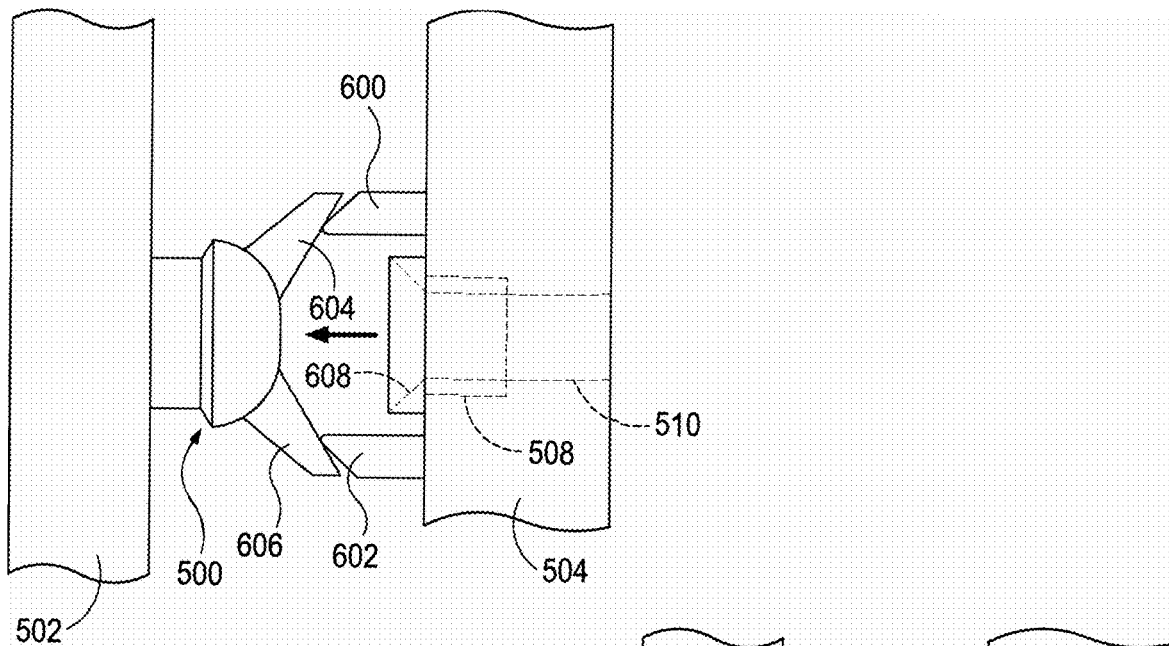
Figure 6B:
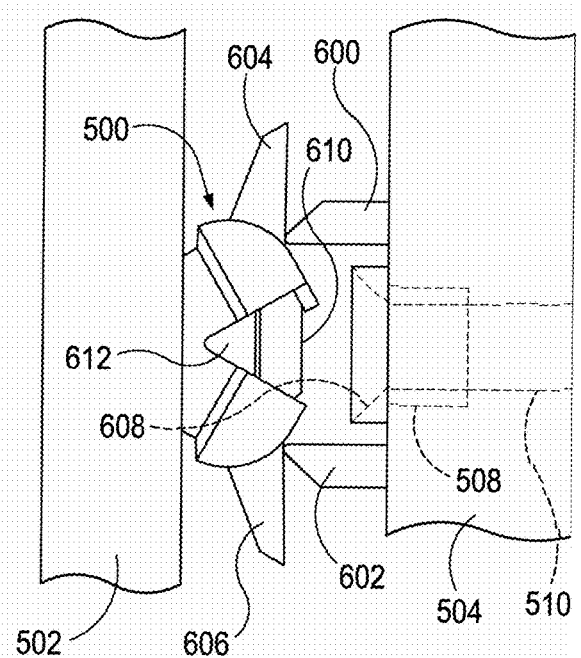
Figure 6C:
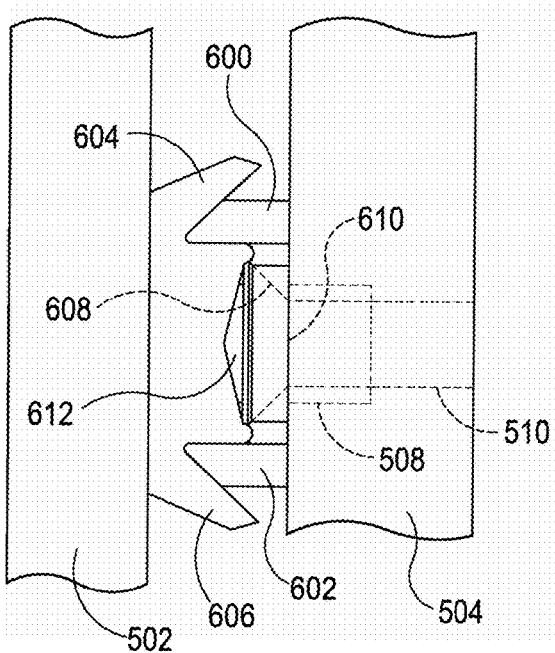

FIGS. 6a-6c show positions of the palpebral cleaning structures during the connection process. In FIG. 6a, a pair of actuation prongs 600 and 602 protruding from rack backplane section 504 begin to engage a pair of lid levers 604 and 606 for a fiber-end cleaning cap 500 in connector bar 502. FIG. 6a also shows a chamfered counterbore 608 in receptacle sleeve 508.

FIG. 6b shows the position of lid levers 604 and 606 under a half-seated connection. As shown, this results in opening fiber-end cleaning cap 500, similar to opening an eyelid. This exposes the head 610 of a plug sleeve 612. As shown, head 610 has a chamfer that has the same chamfer angle as chamfered counterbore 608.

FIG. 6c shows a fully seated connection. Under this configuration, the chamfered end of head 610 of plug sleeve 612 engages with chamfered counterbore 608. This results in precise alignment of the end of a fiber (not shown) inserted into plug sleeve 612 and the left end of fiber 510.

In another embodiment that is not shown, elastomeric covers/lids are used on both the Rack Backplane and the Connector Bars, and as the plugging action progresses the opposing lid levers activate/open the opposing palpebral structures. This embodiment will clean both the receptacle and plug sleeve fiber ends. Also not shown is an embodiment in which the elastomeric faces have surfaces which hermetically seal all the connections, which prevents long term dry out of the optical lubrication.

Figure 7A:
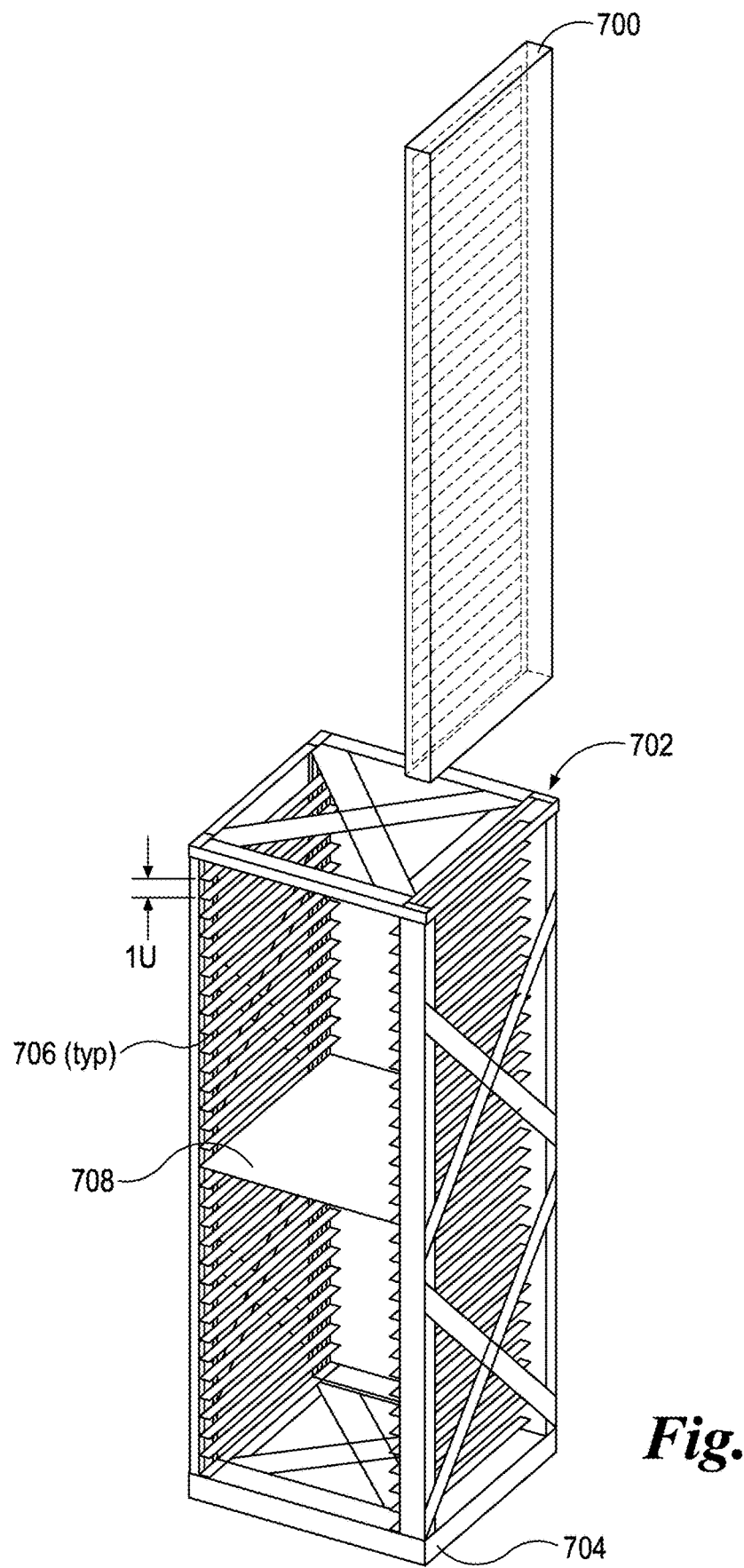
FIGS. 7a and 7b show insertion of a rack loom into a backplane slot in a rack.

As shown in FIG. 7a, a rack loom comprising a wormhole backplane 700 is installed in a backwall slot 702 of a rack 704. In some embodiments, rack 704 is a standard size rack having multiple slots 706 in which various type of electronics chassis, drawers, and/or sleds may be installed. In one embodiment, rack 704 is a 42 U rack and slots 706 are 1 U slots. However, this is merely exemplary and non-limiting, as other slot heights may be supported. Rack 704 further includes a shelf 708, which is optional.

Figure 7B:
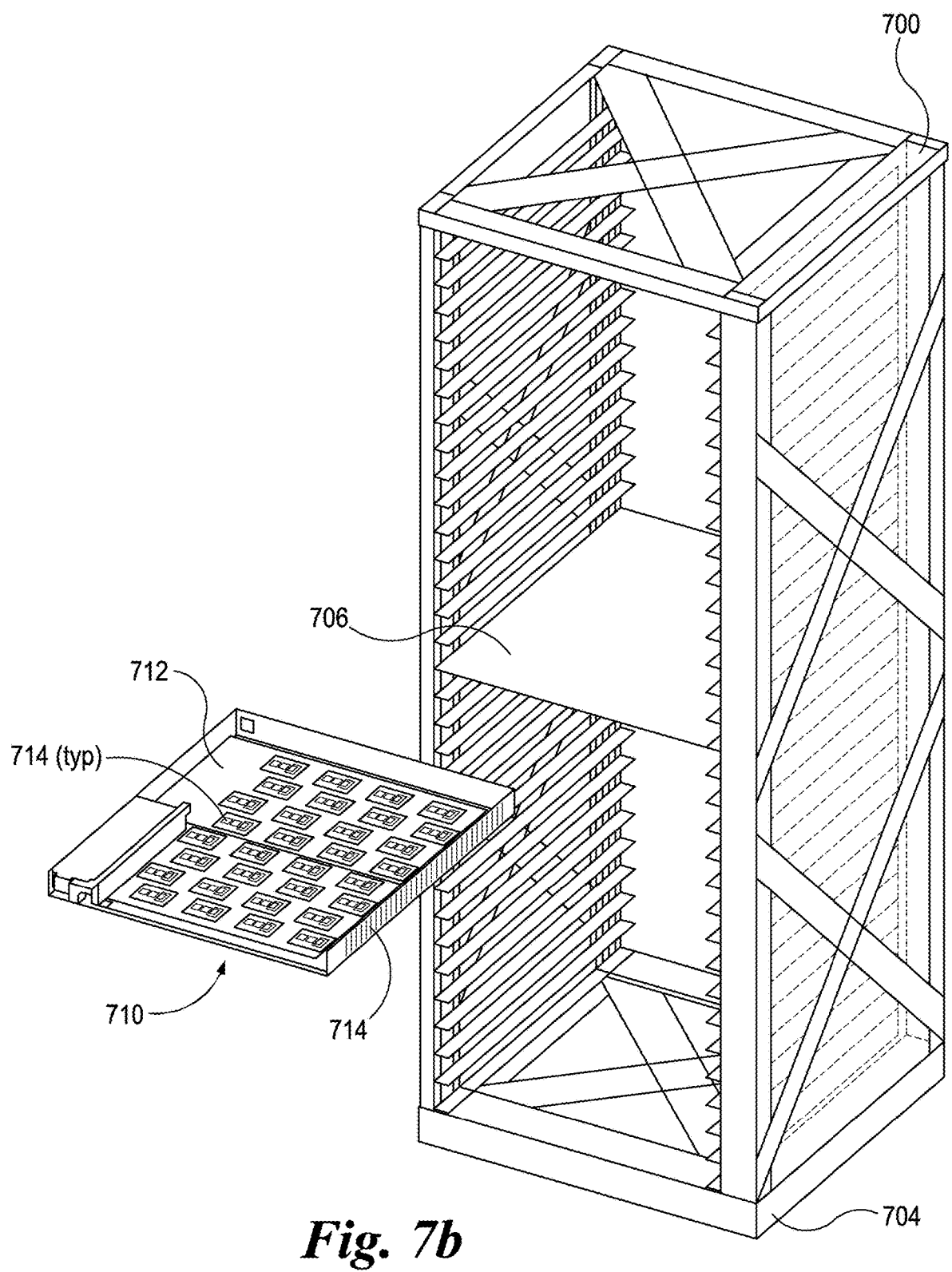

FIG. 7b shows wormhole backplane 700 installed in rack 704. FIG. 7b further shows a sled 710 including a main board 712 to which various components 714 are mounted or otherwise operatively coupled. Sled 712 further includes a sled loom having an integrally-formed connector bar 714.

Figure 7C:
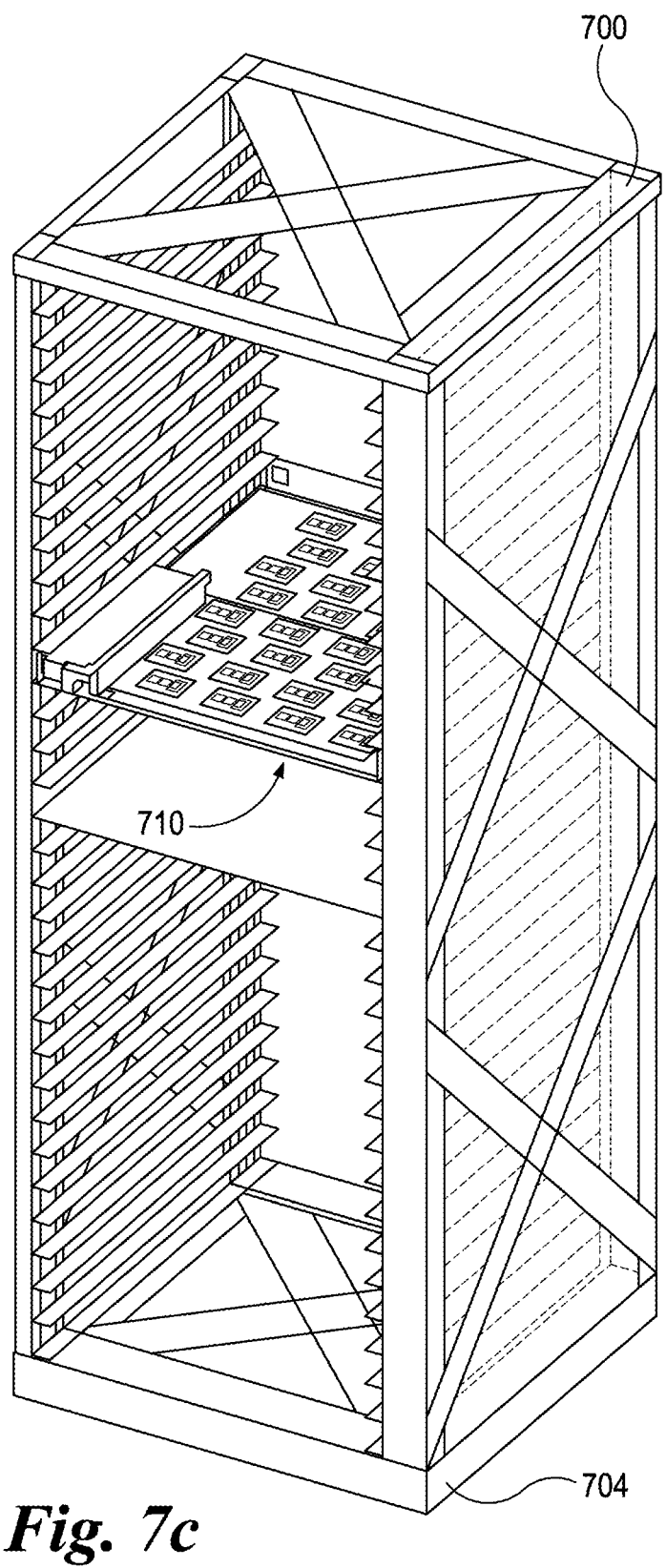
FIG. 7c shows a compute sled with sled loom coupled the rack loom.

FIG. 7c shows sled 710 installed in a slot in rack 704. When installed, the plug sleeves in connector bar 714 (shown in FIG. 7b) are mated with receptacle sleeves in wormhole backplane 700 in a manner similar to that illustrated in FIG. 6c and discussed above.

Support for PIUMA Architecture

In one aspect, sled looms may be implemented in sleds that are deployed in large multi-dimensional networks such as PIUMA (Programmable Integrated Unified Memory Architecture). PIUMA compute components are used to perform graph processes, among other uses. In one embodiment, sled 712 comprises a PIUMA sled. In one embodiment, multiple PIUMA sleds with sled looms are installed in a rack with a rack loom.

Figure 8:
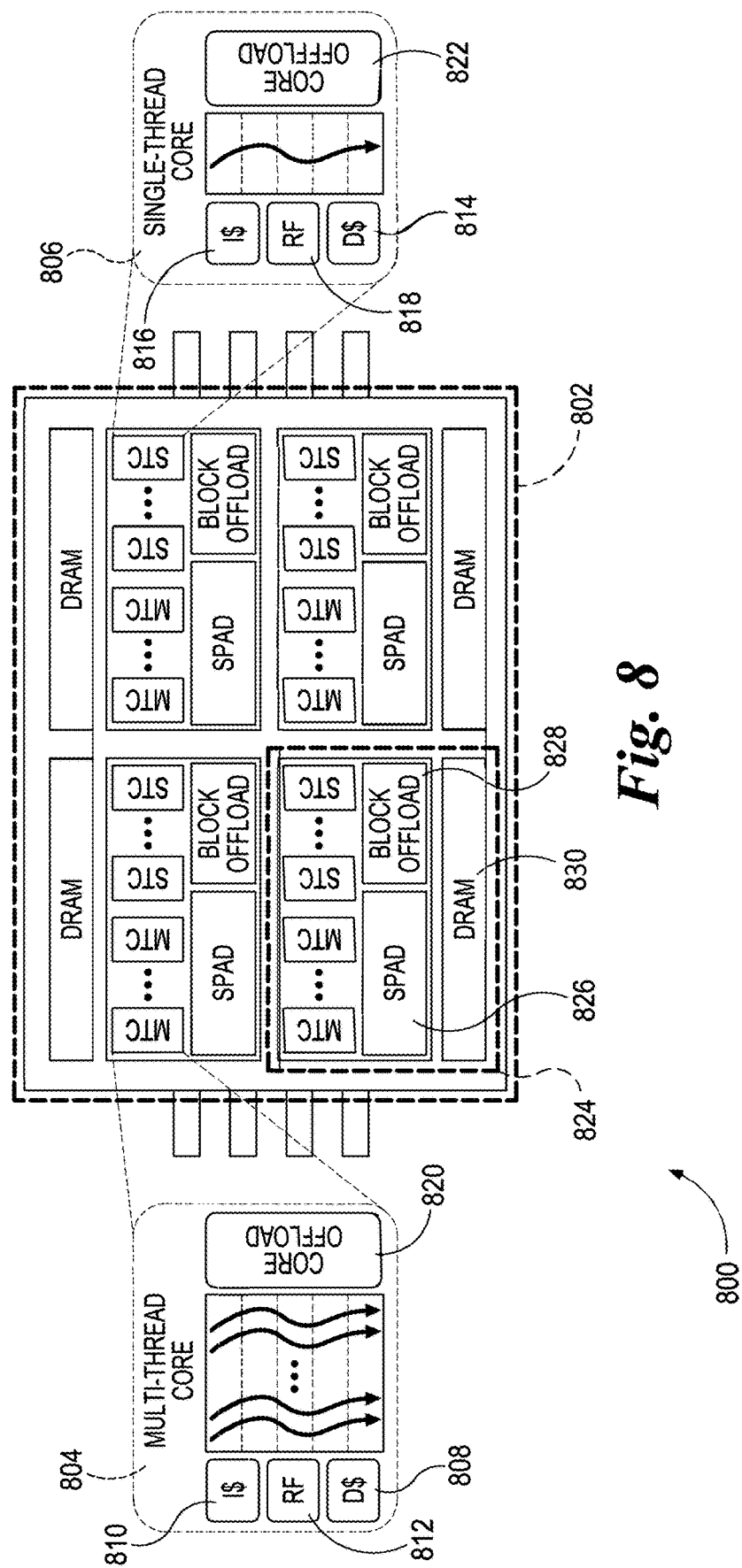
FIG. 8 is a schematic diagram of illustrating a core tile for a PIUMA architecture, according to one embodiment.

A diagram 800 illustrating a core tile for a PIUMA architecture is shown in FIG. 8. The design of PIUMA cores builds on the observations that most graph workloads have abundant parallelism, are memory bound and are not compute intensive. These observations call for many simple pipelines, with multi-threading to hide memory latency.

At a physical component level, the smallest unit in the PIUMA architecture is a PIUMA die, which is integrated as a System on a Chip (SoC), also referred to as a PIUMA chip or PIUMA socket. As explained an illustrated below, a PIUMA die/socket includes multiple core tiles and switch tiles. In the illustrated embodiment, each core in a PIUMA core tile 802 has two types of cores including multi-thread cores (MTCs) 804 and single-thread cores (STCs) 806.

MTCs 804 comprise round-robin multi-threaded in-order pipelines. At any moment, each thread can only have one in-flight instruction, which considerably simplifies the core design for better energy efficiency. STCs 806 are used for single-thread performance sensitive tasks, such as memory and thread management threads (e.g., from the operating system). These are in-order stall-on-use cores that are able to exploit some instruction and memory-level parallelism, while avoiding the high-power consumption of aggressive out-or-order pipelines. In one embodiment, both core types implement the same custom RISC instruction set.

Each MTC and STC has a small data and instruction cache (D$ and I$), and a register file (RF) to support its thread count. For multi-thread core 804 this includes a data cache (D$) 808, an instruction cache (I$) 810, a register file 812. For single-thread core 806 this includes a D$ 814, an I$ 816, and a register file 818. Each multi-thread core 804 also includes a core offload engine 820, while each single-thread core 806 includes a core offload 822.

Because of the low locality in graph workloads, no higher cache levels are included, avoiding useless chip area and power consumption of large caches. In one embodiment, for scalability, caches are not coherent across the whole system. It is the responsibility of the programmer to avoid modifying shared data that is cached, or to flush caches if required for correctness. MTCs 804 and STCs 806 are grouped into Cores 824 (also called blocks), each of which has a large local scratchpad (SPAD) 826 for low latency storage, a block offload engine 828, and local memory (e.g., some form of Dynamic Random Access Memory (DRAM) 830). Programmers are responsible for selecting which memory accesses to cache (e.g., local stack), which to put on SPAD (e.g., often reused data structures or the result of a DMA gather operation) and which not to store locally. There are no prefetchers to avoid useless data fetches and to limit power consumption. Instead, block offload engines 828 can be used to efficiently fetch large chunks of useful data.

Although the MTCs hide some of the memory latency by supporting multiple concurrent threads, their in-order design limits the number of outstanding memory accesses to one per thread. To increase memory-level parallelism and to free more compute cycles to the cores, a memory offload engine (block offload engine 828) is added to each Core 824. The block offload engine performs memory operations typically found in many graph applications in the background, while the cores continue with their computations. The direct memory access (DMA) engine in block offload engine 828 performs operations such as (strided) copy, scatter and gather. Queue engines are responsible for maintaining queues allocated in shared memory, alleviating the core from atomic inserts and removals. They can be used for work stealing algorithms and dynamically partitioning the workload. Collective engines implement efficient system-wide reductions and barriers. Remote atomics perform atomic operations at the memory controller where the data is located, instead of burdening the pipeline with first locking the data, moving the data to the core, updating it, writing back and unlocking. They enable efficient and scalable synchronization, which is indispensable for the high thread count in PIUMA.

The engines are directed by the PIUMA cores using specific PIUMA instructions. These instructions are non-blocking, enabling the cores to perform other work while the operation is done in the background. Custom polling and waiting instructions are used to synchronize the threads and offloaded.

Figure 9:
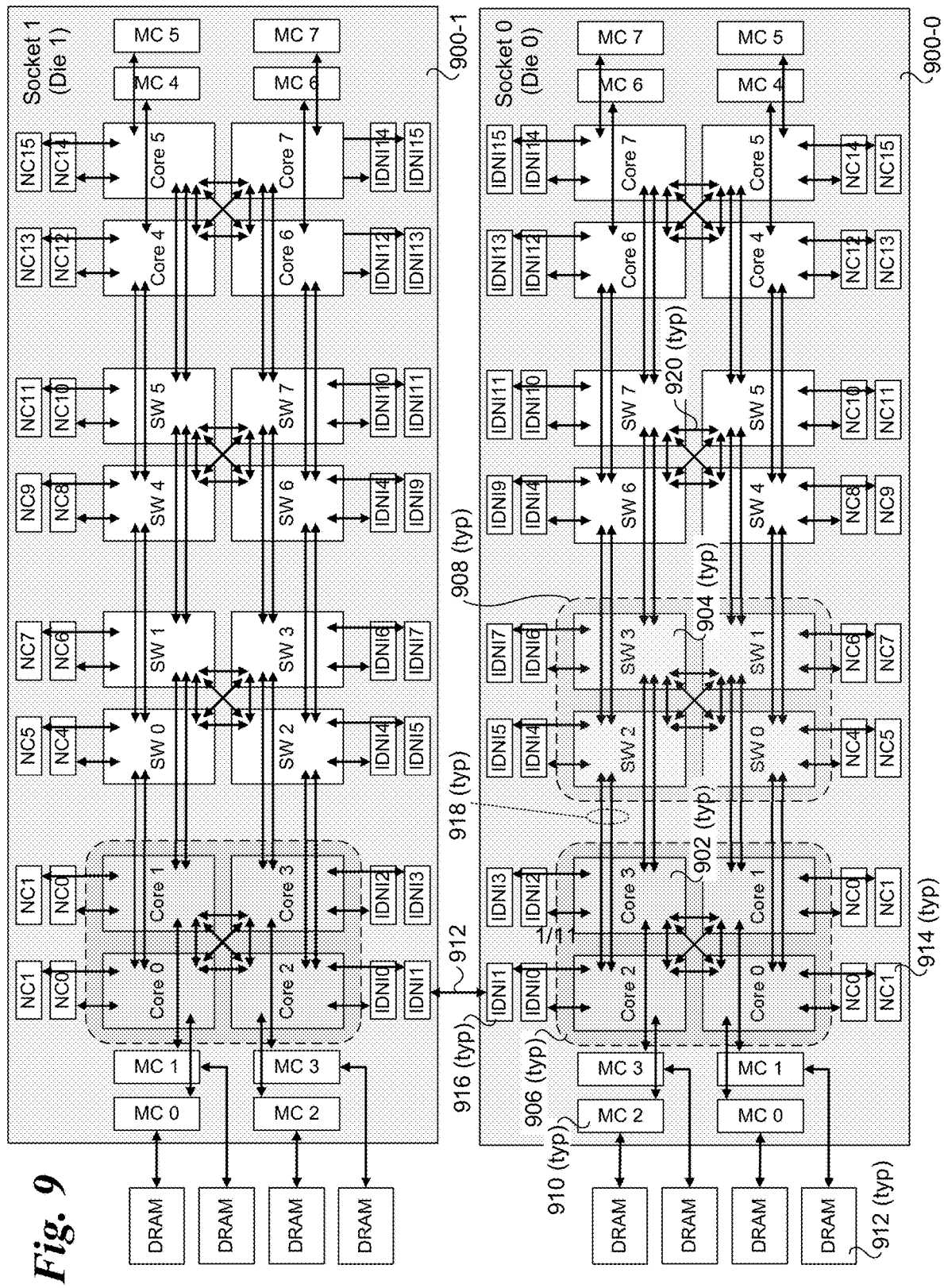
FIG. 9 is a schematic diagram illustrating a pair of sockets or dies in the PIUMA architecture, according to one embodiment.

FIG. 9 shows further details of the architecture of a PIUMA die/socket, according to one embodiment. FIG. 9 shows a pair of sockets 900-0 and 900-1. Generally, a PIUMA die/socket comprises a plurality of cores 902 and switches 904 arranged on core tiles 906 and switch tiles 908. In the illustrated embodiment, sockets 900-0 and 900-1 comprise two core tiles 906 having four cores 902, and two switch tiles 908 having four switches 904 each. In another embodiment, a PIUMA die/socket comprises four switch tiles comprising 16 switches.

Each core 902 is connected to a respective memory controller (MC) 910, which in turn is connected to process memory comprising DRAM 912. As illustrated for socket 900-0, Each of the lower pair of cores in a core tile or lower pair of switches in a switch tile are connected to a pair of network controllers (NC) 914, while each of the upper pair of cores in a core tile or switches in a switch tile are connected to a pair of inter-die network interfaces (INDI) 916.

A pair of bidirectional links 918 connect each switch 904 of a tile T to corresponding core or switch (as applicable) in the tile towards the left or right of T. Each of the switches in a switch tile 908 are interconnected with each other switch in the switch tile via bidirectional links 920.

PIUMA switches are configured to perform in-flight packet reduction (reduction on both packets and data contained in the packets) and include configurable routing capabilities that allow collective topologies to be embedded into the network. Their flow control mechanism further enables pipelined computation over numerous single element packets for high throughput vector collectives.

Collective packets in a PIUMA network are routed on an exclusive virtual channel. The scheduling mechanism in PIUMA switches prioritizes packets on a collective virtual channel. Hence, performance of in-network collectives is unaffected by the rest of the network traffic.

Each input port of the switch has a FIFO buffer associated with the collective virtual channel for transient storage of the data packets. For an in-network prefix scan, these buffers constitute the network memory available for storage of partial sums.

Each PIUMA switch has configuration registers that specify the connectivity between input-output (IO) ports for the collective virtual channel. As each port is connected to a fixed neighboring switch, configuration registers effectively provide a low-level control over the routing paths in a network embedding.

Additionally, each switch consists of a Collective Engine (CENG) that can reduce in-flight packets on multiple input ports. Configuration registers of the switch also specify the input ports participating in reduction by the CENG, and the output port where the reduction result is forwarded. Embedding prefix scan into a PIUMA network can therefore be reduced to the problem of setting the switch configurations such that routing and reduction patterns in the network emulate a logical topology of the prefix scan. The CENG can also perform the applicable \oplus operations (e.g., sum, multiplication, max, etc.) used for calculating the prefix scans in-network, wherein the calculations are completely offloaded from the cores or other types of compute units coupled to the network.

Figure 10:
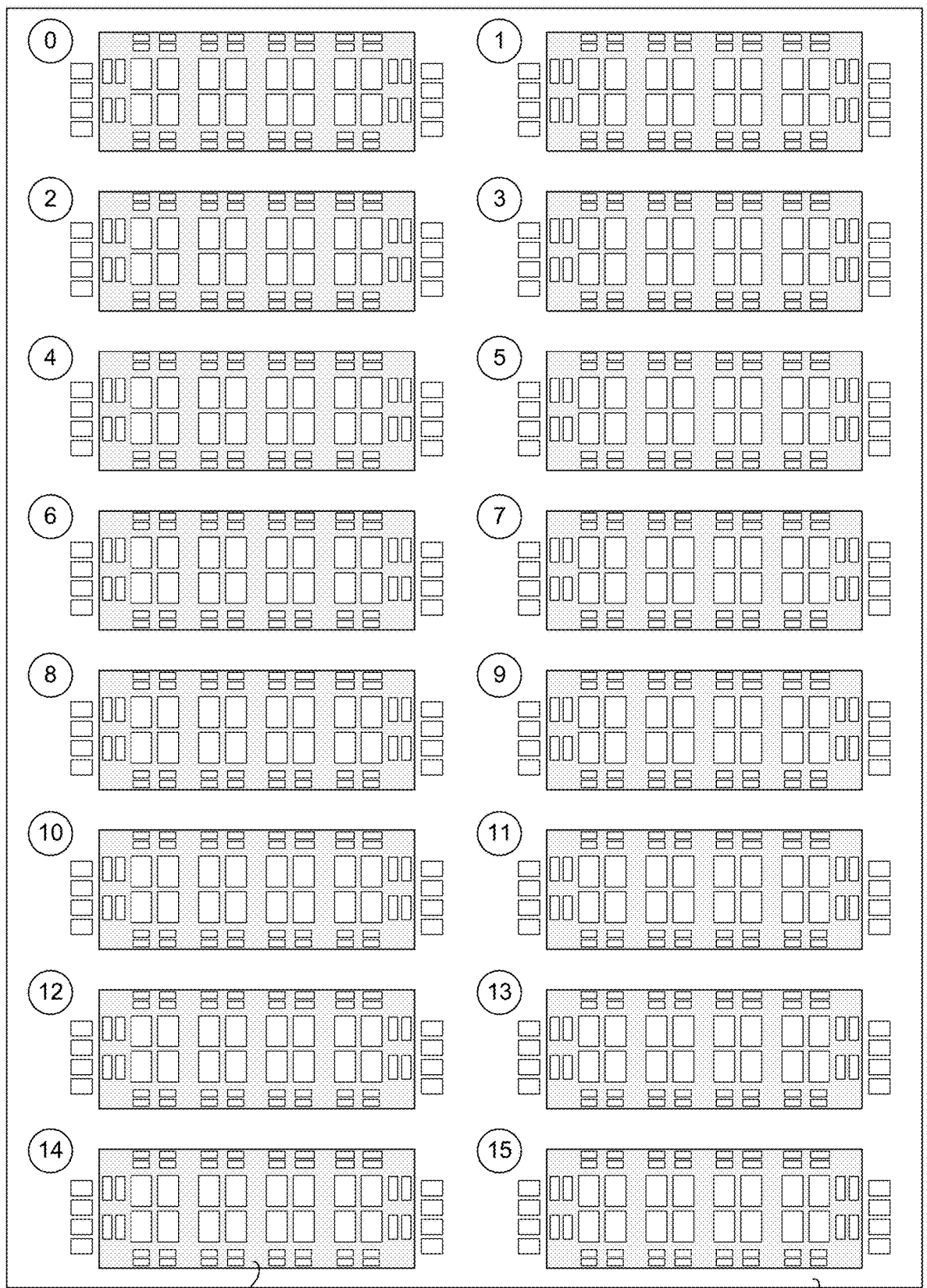
FIG. 10 is a schematic diagram of a PIUMA subnode, according to one embodiment.

FIG. 10 shows a high-level view of a PIUMA subnode 1000, according to one embodiment. PIUMA subnode 1000 includes 16 dies or sockets 1002. The 16 dies or sockets are interconnected using inter-die or inter-socket links such that each die or socket is coupled directly or indirectly to each other die or socket. Under one embodiment of a PIUMA node, the number of dies or sockets is 32. Both the values of 16 dies/sockets for a PIUMA subnode and 32 dies or sockets for a PIUMA node are merely exemplary and non-limiting.

The terms dies and sockets are generally used interchangeably herein. A PIUMA subnode or node may comprise multiple integrated circuit dies that are arranged on a body and interconnected via "wiring" formed in the body. A PIUMA socket may generally comprise an integrated circuit (IC) chip that is a separate component (or otherwise a separate "package"). For a PIUMA subnode or node comprised of PIUMA sockets, the sockets may be mounted to a printed circuit board (PCB) or the like, or may be configured using various other types of packaging such as using a multi-chip module or a multi-package module.

Figure 11:
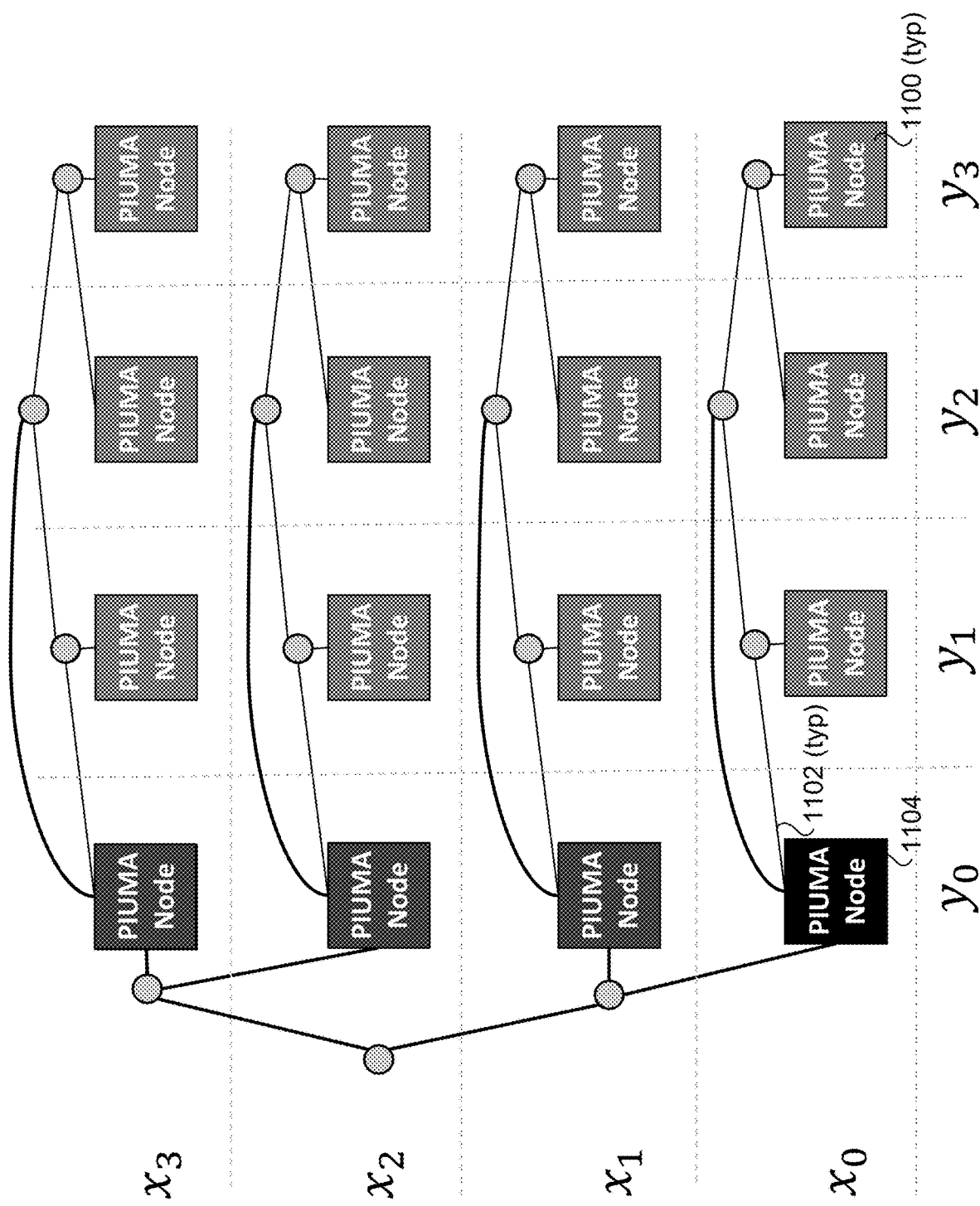
FIG. 11 is a diagram of a PIUMA system including an array of PIUMA nodes or subnodes.

The proposed topology enables scaling the computation to large multi-dimensional networks. For instance, FIG. 11 shows a 2-dimensional PIUMA system with 16 subnodes 1100 arranged in an xy grid with rows x0, x1, x2 and x3 and columns y0, y1, y2 and y3 and interconnected via links 1102. The horizontal (x) and vertical (y) directions represent the first and the second dimension, respectively. The prefix tree in vertical dimension is built on the 0^{th} subnode of all four trees in the horizontal dimension. The embedding can be scaled to a third dimension by using the black subnode 1104 at the left-bottom for the tree in the third dimension, while leaving the rest of the embedding unchanged.

Figure 12:
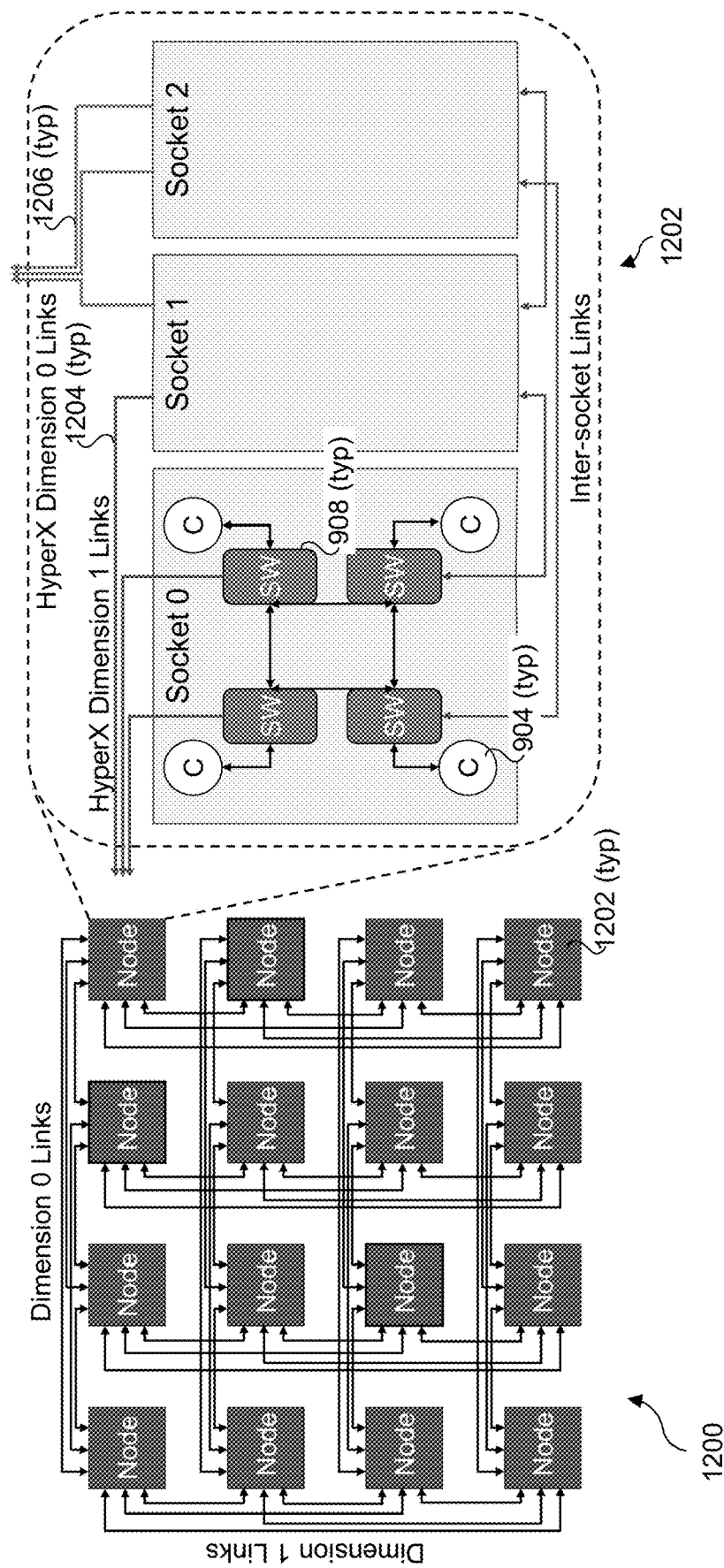
FIG. 12 is a diagram of a PIUMA system illustrating details of selected interconnects.

FIG. 12 shows a distributed environment 1200 comprising 16 PIUMA nodes or subnodes 1202 interconnected by a plurality of links. In a 2D array of PIUMA nodes or subnodes, the links comprise Dimension 0 links that interconnect nodes or subnodes on a row-wise basis and Dimension 1 links that interconnect nodes or subnodes on a column-wise basis. The right side of FIG. 12 shows another view of a PIUMA node or subnode 1202, which comprises a plurality of sockets 1204 interconnected by inter-socket links. As describe and illustrated above, each socket comprises a plurality of core tiles 904 and switch tiles 908. The network interfaces in the switches in the switch tiles are used to interconnect nodes or subnodes, as depicted by HyperX Dimension 1 links 1204 and HyperX Dimension 0 links 1206.

PIUMA implements a distributed global address space with a HyperX topology connecting the nodes, and an on-chip mesh for connectivity within each node as shown in FIG. 12. Memory within each node is divided into several blocks, each of which is connected to a respective core. Each switch is also connected with a core and has direct access to its local memory block for low-latency remote memory accesses. For in-network collectives, this allows switches to stream data packets between memory and network without core intervention (complete network offload).

The ports on these switches provide connectivity at different levels of the network hierarchy. In one embodiment, sockets within each node and peer nodes in any dimension of the HyperX are all-to-all connected. These dense connectivity patterns substantially simplify embedding of prefix scan. The hierarchical design also allows low-latency optical interconnections for long distance links between sockets and nodes.

To support the high scalability provided by the PIUMA architecture, a very large number of optical interconnects are needed; this problem cannot be solved using current optical connector technologies. The solution to this problem is provided by embodiments of the sled wormhole looms and backplane looms described and illustrated herein. For example, under the teachings and principles disclosed herein, the number of fibers within a standard 42 U rack may reach 2 million. This is far beyond anything achieved to date using current optical connector technologies; approximately the interconnections needed for an all-to-all network of 32 PIUMA compute nodes in each 1 U sled×42 U's in a rack.

As will be recognized by those skilled in the art, the number of optical connections between PIUMA sleds is very large. Ideally, for full scale out, the number of optical connections that would be necessary is not possible with today's optical connectors. The wormhole looms and backplane (e.g., rack) looms and associated components disclosed herein support optical interconnect densities that are an order of magnitude (or more) greater than what is currently available.

In addition to providing massively higher optical fiber densities, the wormhole looms cost orders of magnitude less than current fiber connection technologies. Embodiments also provide a self-cleaning function for the fiber ends, and improve alignment accuracy, which results in lower optical energy losses while enabling blind mating of massive fields of optical fibers. The embodiments support more uniform mating forces between fiber ends; even while connecting single mode, polarized and lensed fibers. Moreover, wormhole loom solutions can be scaled to substantially any size through use of modules.

New super MTP connectors are possible with the solutions provided herein: No size limit in terms of number of fibers—essentially just a scaled down version of the Wormhole Backplanes into handheld versions which breaks the current maximum fiber (single mode) boundary of 24 fibers per connector. These super MTP Connectors can build up any sized/density trunk cables, or provide a great way of connecting cables to Wormhole Backplanes—thereby reducing the number and volume of interconnection devices between optical computation devices.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An optical connector loom, comprising:
a body, having microstructures comprising a plurality of wormhole tunnels formed therein, the wormhole tunnels having first openings disposed in a face of the body and forming a predefined pattern;
a plurality of optical fibers, disposed in respective wormhole tunnels, wherein a number of optical fibers is equal to or less than a number of wormhole tunnels; and
a plurality of sleeves having a first end of a respective optical fiber disposed therein, the plurality of sleeves disposed in first openings of respective wormhole tunnels.

2. The optical connector loom of claim 1, wherein the wormhole tunnels have a diameter of approximately 0.125 millimeters (mm) or less.

3. The optical connector loom of claim 1, wherein the plurality of optical fibers comprise single mode fibers having a core diameter of approximately 8 microns.

4. The optical connector loom of claim 1, wherein the body comprises a resin, and the optical connector loom is fabricated using a three-dimensional (3D) resin printing process using light projection to cure the resin.

5. The optical connector loom of claim 1, wherein the optical loom comprises one of a connector bar having a face or a connector bar module having a face, and wherein the predefined pattern of first ends of the wormhole tunnels comprises a two-dimensional grid in the face of the connector bar or the connector bar module.

6. The optical connector loom of claim 1, wherein the body has a plurality of palpebral structures having a lid formed over respective first openings for at least a portion of the wormhole tunnels, and wherein the palpebral structure includes a pair of lid levers that are configured to open the lid when the lid levers engage actuation prongs protruding from a face of a second optical connector loom when the first optical loom is mated to the second optical loom.

7. The optical connector loom of claim 1, wherein the optical connector loom comprises a body in a sled configured to be installed in a rack having an optical connector rack loom comprising a wormhole backplane installed therein.

8. The optical connector loom of claim 1, wherein the optical connector loom is a rack loom comprising a wormhole backplane configured to be installed in a data center rack.

9. The optical connector loom of claim 8, wherein, for at least a portion of the plurality of optical fibers a first end of the optical fiber is disposed in a first sleeve that is installed in a first opening of a wormhole in which the optical fiber is disposed and a second end of the optical fiber is disposed in a second sleeve that is installed in a second opening of the wormhole.

10. The optical connector loom of claim 8, where the number of optical fibers is on the order of 1 million.

11. A compute sled, comprising:

a main board, to which a plurality of electronic components are mounted or operatively coupled, the plurality of electronic components including multiple optical modules;

a sled loom comprising a body having a plurality of wormhole tunnels formed therein, the wormhole tunnels having first openings disposed in a face of the body;

a plurality of optical fibers, disposed in respective wormhole tunnels, wherein a number of optical fibers is equal to or less that a number of wormhole tunnels;

a plurality of sleeves having a first end of a respective optical fiber disposed therein, the plurality of sleeves installed in first openings of respective wormhole tunnels; and means for optically coupling the second ends of the optical fibers to the multiple optical modules.

12. The compute sled of claim 11, wherein the wormhole tunnels have a diameter of approximately 0.125 millimeters (mm) or less.

13. The compute sled of claim 11, wherein the plurality of optical fibers comprise single mode fibers having a core diameter of approximately 8 microns.

14. The compute sled of claim 11, wherein the body comprises a resin, and the optical connector loom is fabricated using a three-dimensional (3D) resin printing process using light projection to cure the resin.

15. The compute sled of claim 11, wherein the body has a plurality of palpebral structures having a lid formed over respective first openings for at least a portion of the wormhole tunnels, and wherein the palpebral structure includes a pair of lid levers that are configured to open the lid when the lid levers engage actuation prongs protruding from a face of a second optical connector loom when the first optical loom is mated to the second optical loom.

* * * * *